United States Patent [19]

Buser et al.

[11] Patent Number: 4,602,046

[45] Date of Patent: Jul. 22, 1986

[54] RECOVERY OF POLYESTER FROM SCRAP BY HIGH SHEAR CONDITIONS

[75] Inventors: Kenneth R. Buser, Wilmington, Del.; Thomas A. Rettig, West Chester, Pa.

[73] Assignee: E. I. Du Pont de Nemours and Company, Wilmington, Del.

[21] Appl. No.: 693,253

[22] Filed: Jan. 22, 1985

[51] Int. Cl.$^4$ .......................... C08J 11/04; C08J 11/06
[52] U.S. Cl. ......................................... 521/46; 521/40; 521/48
[58] Field of Search .............................. 521/40, 48, 46

[56] References Cited

U.S. PATENT DOCUMENTS

| | | | |
|---|---|---|---|
| 3,098,046 | 7/1963 | Siggel et al. | 521/48 |
| 3,503,904 | 3/1970 | Dietz et al. | 521/46 |
| 3,652,466 | 3/1972 | Hittel et al. | 521/48 |
| 3,873,314 | 5/1975 | Woo et al. | 521/46 |
| 3,928,253 | 12/1975 | Thornton et al. | 521/46 |
| 4,324,705 | 4/1982 | Seto et al. | 521/48 |

FOREIGN PATENT DOCUMENTS 870639 6/1961 United Kingdom .................. 521/48

*Primary Examiner*—Allan M. Lieberman
*Attorney, Agent, or Firm*—Donald W. Huntley

[57] ABSTRACT

A method for the recovery of plastic material such as polyester from scrap material such as photographic film having a polyester base and at least one layer of a macromolecular organic polymer. The process includes mixing small pieces of the scrap material in a solution having a scrap solids concentration level of at least 25 percent by volume. The mixture is subjected to conditions of high shear to remove and comminute the polymer layer to particles of a maximum size particle dimension substantially smaller than the minimum size in the longest dimension of the scrap pieces. The polymer particles are then separated from the remaining pure polyester.

11 Claims, No Drawings

RECOVERY OF POLYESTER FROM SCRAP BY HIGH SHEAR CONDITIONS

BACKGROUND OF THE INVENTION

1. Field of the Invention

This invention relates to the recovery of polyester base from scrap materials such as photographic films and other articles which normally have polymeric coatings applied to them during manufacture. More particularly, it relates to the recovery of the polyester material by subjecting the scrap materials to controlled conditions of high shear to remove the coatings.

2. Description of the Prior Art

Polyethylene terephthalate (PET), or polyester as it is commonly known, has been widely used as a base material for a variety of applications such as in photographic films, soda bottles and recording tapes. In many applications, the polyester is coated with binders, adhesives and metal compounds.

In the manufacture of photographic films, for example, the PET film base is coated with an adhesive polymer layer of a polyvinylidene chloride (PVCD) based resin commonly referred to as saran. This polymer layer is needed to permit the adhesion of the light-sensitive emulsion layer, usually a silver halide dispersed in gelatin, to the PET base since the gelatin does not bond well to a clean polyester surface. A saran layer may also be used in the manufacture of PET soda bottles and other PET articles.

Millions of pounds of polyester are scrapped each year because the presence of the PVCD coating inhibits recovery. It is obviously quite desirable to convert this scrapped PET into clean polyester which can be recycled as raw material in the production of polyester feedstocks for fibers, films and other articles. In the case of photographic film scrap, it would also be desirable to recover the silver in the halide emulsion. Recovery of the polyester and, in the case of scrap photographic film, of the silver in forms which are reusable reduces solid waste disposal problems and conserves our natural resources through recycling of these materials.

Prior art methods for recovering PET base material from photographic film, for example, have included treating the scrap material with hot caustic alkali solutions and with solvents. U.S. Pat. No. 3,652,466, which issued Mar. 28, 1972, to E. R. Hittel and assigned to the same assignee as the present application, is directed to a polyester recovery process which involves treating small pieces of coated film with a caustic aqueous alkali solution to form a slurry. The slurry is then fed down into a classification column wherein the countercurrent flow of a slowly rising aqueous liquid separates the PVCD coating from the polyester pieces.

In U.S. Pat. No. 3,873,314, which issued Mar. 25, 1984, to J. T. K. Woo et al, scrap photographic film is treated by solvents such as dimethylformamide (DMF) and tetrahydrofuran (THF). The mixtures as subjected to low shearing action by stirring to dissolve the halide emulsion, and PVCD resin layer. In both U.S. Pat. Nos. 3,503,904, which issued to H. J. Dietz et al on Mar. 31, 1970, and 3,928,253, which issued to J. S. Thornton et al on Dec. 23, 1975, the film scrap is treated with an alkaline glycol such as ethylene glycol to remove the PVCD subcoating and the photographic emulsion layers. As in the case of the foregoing prior art patents, the mixtures are agitated through low shearing action.

The prior art processes suffer from several disadvantages which make them economically infeasible. In the case of photographic films, a significant amount of silver is not recovered.

Moreover, merely subjecting small pieces of scrap film to a hot caustic or a solvent, and stirring the mixture in the manner described by the prior art causes the pieces to stick together when they contact one another so that a high degree of agglomeration occurs. This makes it extremely difficult to clean the individual polyester pieces sufficiently to permit recovery of commercially pure polyester.

The present invention overcomes the limitations and disadvantages of the prior art by providing a recovery process by which essentially pure polyester and indeed other plastic base materials may be recovered efficiently and economically through the effective use of high shear conditions. The silver values in scrap photographic film can likewise be recovered by subjecting the scrap film to similar high shear conditions as described and claimed in copending application Ser. No. 693,252, entitled "Recovery of Silver From Photographic Films by High Shear Conditions", filed the same date and by the same applicants as the present application.

SUMMARY OF THE INVENTION

A process for the recovery of plastic material from articles having a plastic base material and at least one layer of a macromolecular organic polymer which comprises:

mixing small pieces of the plastic article with a solution containing a chemical which aids in the removal of the polymer layer from the base material wherein the resulting mixture has a solids concentration level of at least 25 percent by volume, subjecting the mixture to conditions of high shear until the polymer layer is removed from the pieces and is comminuted to particles of a maximum particle size dimension substantially smaller than the minimum size in the longest dimension of the plastic pieces, and separating the polymer particles to recover pieces of essentially pure plastic material.

The recovered pieces can be used as a source of plastic material such as polyester which can be used to make films, filaments, or other shaped articles.

DETAILED DESCRIPTION OF THE INVENTION

The present invention provides an efficient and economically attractive process for recovering polyester base material from scrap photographic films and other articles which have at least one coating of a macromolecular organic polymer coating, such as polyvinylidene chloride (PVCD). The scrap material is cut or chopped into small individual pieces or flakes of irregular sizes and shapes, ranging in size from about 2 to about 20 millimeters in the longest dimension. The pieces or flakes are then treated in a caustic alkali solution at a solids level of at least 25 percent by volume and under conditions of high shear until the organic polymer coating material is removed from the polyester flakes and comminuted to a particle size of less than about 150 micrometers. The polyester flakes are then separated from polymer coating material by filtration or centrifugation through a suitable filtration medium that passes particles of less than 150 microns. The polyester flakes are then rinsed in the water to remove any remaining contamination and dried.

When the source of scrap material is photographic film, the film flakes are first treated to remove the silver halide emulsion layer in order to recover the silver values. As described in greater detail in the aforenoted copending application Ser. No. 693,252, the flakes are treated in hot water under conditions similar to those described in the present case: at solids level of at least 25 percent by volume and high shear. After the gelatin layer is removed, the flakes are treated in accordance with the present invention to remove the PVCD coating.

The recovered polyester flake is sufficiently pure so as to be suitable for use as a feedstock for making films, bottles or other polyester articles. An important feature in this ivention, as well as that of aforenoted copending application Ser. No. 693,252, is the relatively high solids level of scrap material. When pieces or flakes of the scrap at solids levels of at least about 25 percent by volume are subjected to the high shearing conditions described in the following examples, the high shearing forces created will effectively strip the coatings from the polyester base material. The process takes advantage of the difference in tensile properties of the coating and polyester base materials so that the high shear conditions will also reduce the particle size of the coating resins to less than 150 microns while minimizing the attrition of the flakes.

The conditions of high shear achieved in the present invention and in that of copending application Ser. No. 693,252, provide an economically feasible process for commercial scale recovery of silver values from scrap photographic films and polyester from these films or other scrap articles with a PET base material.

The invention is further understood by the following examples.

EXAMPLE 1

A steam-jacketed, stainless steel tank of about 50 gallons capacity containing a motor-driven, 6-bladed rotor of about 10 inches in diameter at the bottom of the tank was charged with 200 lbs of water at about 158° F. and 14 lbs of "Ridoline" 3000 (a commercially available alkaline detergent sold by Amchem Corporation). To this stirred solution at about 190° F. was then added about 144 lbs of polyester film flake having the composition of about 99.4% by weight polyethylene terephthalate; about 0.5% by weight of a proprietary terpolymer of vinylidene chloride, acrylic ester monomer and itaconic acid; and about 0.1% by weight of photographic gelatin and prepared as described in U.S. Pat. Nos. 2,465,319 and 2,627,088. The flakes ranged in size from about 2 to about 20 millimeters in longest dimension (the majority being about 5 to about 7 millimeters in longest dimension) and the thickness being about 0.100 millimeter. The flake concentration was about 32.7% by volume. The alkalinity was about 1.0N.

This mixture was sheared at a rotor speed of about 1300 rpm and a temperature of about 190°-198° F. Removal of coatings from flake and comminution of coatings to less than 100 microns in particle size was essentially complete in less than twenty minutes. The size of the flake was reduced insignificantly by the treatment.

Flake was separated from dirty cleaning fluid by filtration through a 100 mesh stainless steel screen. The comminuted coating particles passed through the screen with the filtrate.

Flake collected on the screen was rinsed with cold water until the pH of the rinse was reduced to about 7.0. This required a ratio of water/flake of about 9.5/1.0. The cleaned flake was dried giving a yield of about 97.0% by weight. Surface anaylsis by high resolution ESCA scans indicated that the surface of flakes was essentially free of all organic-bound nitrogen and chlorine. The carbon ($C_{1S}$) spectra was consistent with that expected for polyethylene terephthalate. This indicates essentially complete removal of photographic gelatin and polyvinylidene chloride copolymer. The polyethylene terephthalate recovered was in a form pure enough to be used for the preparation of high-quality fibers and films.

EXAMPLE 2

The tank of Example 1 was charged with about 214 lbs of water at about 170° F. and about 15.8 lbs of "Ridoline" 3000 giving a solution of about 1.0N alkalinity. To this stirred solution was added about 150.3 lbs of polyester film flake of about the same composition and particle size as described in Example 1. The volume solids was about 32.0.

This mixture was sheared at a rotor speed of about 1300±10 rpm. In twenty minutes, the amperage to the stirrer motor gradually dropped from about 26 to 16 amps and the temperature of the batch gradually raised from about 170° to 194° F. Removal of coatings from flake and comminution to less than 100 microns in particle size with no significant reduction in particle size of flake was essentially complete in less than twenty minutes.

Flake was separated from the cleaning fluid, rinsed, and dried as in Example 1. The yield was about 97%. Surface analysis by high resolution ESCA scans indicated that organic-bound chlorine had been reduced to a negligible level. The carbon ($C_{1S}$) spectra was consistent with that expected for polyethylene terephthalate. The polyethylene terephthalate recovered was melt spun into fibers. Pack screen buildup during spinning indicated an insoluble contamination level of only about 5 ppm.

EXAMPLE 3

The tank of Example 1 was charged with about 206 lbs of water at about 160° F. The alkalinity was adjusted to about 1.0N with sodium hydroxide and about 0.1% by weight of "Triton" QS-30 (Rohm and Haas Company) was added. To this stirred solution was added about 48.0 lbs of a polyester film flake of about the same composition and particle size as described in Example 1, and 105.0 lbs of polyester bottle chips containing paper and glue as major contaminants. The volume solids was about 34.5%.

This mixture was sheared at a rotor speed of about 1325±15 rpm. Over a period of thirty minutes, the temperature rose from about 158° F. to 182° F. and the amperage to the stirrer motor decreased gradually from 20 to 17 amps. Coatings were completely removed from the flake in about 15 minutes. Paper and glue from the bottle chips were macerated to a very fine pulp.

Flake and bottle chips were separated from the cleaning fluid, rinsed, and dried as in Example 1. Filtration was carried out through a screen with about ⅛" diameter holes. Analysis indicated that contamination had been reduced to less than 10 ppm. The polyethylene terephthalate recovered was in a form pure enough to be used for the preparation of high quality fibers and films.

EXAMPLE 4

About 4300 lbs of polyester film flake having the composition of about 93.5% by weight polyethylene terephthalate, about 0.1% by weight of a coating of the proprietary terpolymer of vinylidene chloride, acrylic ester monomer and itaconic acid of Example 1, and about 6.4% by weight of a coating of a silver halide/gelatin was treated according to copending application Ser. No. 693,252, to remove the silver halide/gelatin coating while leaving the vinylidene chloride terpolymer coating intact.

About 4000 lbs of this silver halide free film in flake form of about the same particle size of Example 1, but a thickness of about 0.180 millimeter, was added to 4000 lbs of 5% aqueous sodium hydroxide containing about 0.1% by weight of "Triton" QS-30 anionic surfactant at about 160° F. contained in a steam-jacketed, stainless steel tank of about 1870 gallons capacity. The tank contained a motor-driven, 6-bladed rotor of about 28 inches in diameter at the bottom. The flake concentration was about 42.0% by volume.

This mixture was sheared at a rotor speed of about 1300 rpm for 30 minutes. The slurry was filtered through a metal plate containing ⅛ inch diameter holes to remove major quantities of contaminants and then rinsed through a metal screen with ⅛ inch diameter holes until free of alkali and detergent. The flake was dried in a rotary dryer. A 95% yield of polyester flake was obtained which possessed no detectable chlorine by ESCA surface analysis. The polyethylene terephthalate recovered was in a pure form suitable for use in preparation of high quality fibers and films.

The invention is not limited to recovery of polyester but is useful for recovery of other plastic materials which have been coated with a macromolecular polymer. It should also be understood that while the above represents the presently preferred embodiments of the invention, variations and changes within the scope of the invention as defined by the claims may suggest themselves to those skilled in the art.

We claim:

1. A process for the recovery of plastic material from articles having a plastic base material and at least one layer of a macromolecular organic polymer having different tensile properties which comprises:
    mixing pieces of the plastic article ranging in size from about 2 to about 20 millimeters in the longest dimension, with a caustic alkali solution wherein the resulting mixture has a solids concentration level of at least 25 percent by volume,
    subjecting the mixture to conditions of high shear unitl the polymer layer is removed from the pieces and to comminute the polymer layer to particles having maximum size of about 150 microns, and
    separating the polymer particles to recover pieces of essentially pure plastic material.

2. A process according to claim 1 wherein the plastic material is polyethylene terephthalate.

3. A process according to claim 2 wherein the polymer is polyvinylidene chloride.

4. A process according to claim 1 wherein the polymer particles are separated by filtration means that passes only particles no larger than the maximum size of the polymer particles.

5. A process according to claim 3 wherein the solution has an alkalinity of about 1.0N.

6. A process according to claim 1 wherein the mixture is subjected to the high shear conditions by a multibladed rotor drivn at about 1300 revolutions per minute.

7. A process according to claim 1 wherein the solids concentration level is above 30 percent by volume.

8. A process for the recovery of polyester from photographic film having a polyester base and at least one coating of a macromolecular organic polymer of different tensile properties which comprises:
    mixing pieces of the coated film ranging in size from about 2 to about 20 millimeters in the longest dimension with a caustic alkali solution at a solids concentration level of at least 25 percent by volume,
    subjecting the mixture to conditions of high shear so that the polymer layer is removed from the pieces and is comminuted to particles of no greater than about 150 microns within a period of less than about 20 minutes, and
    separating the polymer particles to recover pieces of essentially pure polyester.

9. A process according to claim 8 wherein the polymer is polyvinylidene chloride.

10. A process according to claim 8 wherein the mixture is subjected to the high shear conditions by a multibladed rotor driven at about 1300 revolutions per minute.

11. A process according to claim 8 wherein the longest dimension of each of the film pieces is not reduced appreciably by the high shear conditions, the minimum longest dimension being substantially greater than 150 microns.

* * * * *